United States Patent
Kao

(10) Patent No.: US 11,532,931 B2
(45) Date of Patent: Dec. 20, 2022

(54) CLAMP-TYPE LINE POST INSULATOR

(71) Applicant: GOODWELL ELECTRIC CORPORATION, Taipei (TW)

(72) Inventor: Sui-Chan Kao, Taipei (TW)

(73) Assignee: GOODWELL ELECTRIC CORPORATION, Taipei (TW)

( * ) Notice: Subject to any disclaimer, the term of this patent is extended or adjusted under 35 U.S.C. 154(b) by 311 days.

(21) Appl. No.: 17/073,396

(22) Filed: Oct. 19, 2020

(65) Prior Publication Data
US 2022/0085590 A1    Mar. 17, 2022

(30) Foreign Application Priority Data
Sep. 16, 2020 (TW) .................................. 109131774

(51) Int. Cl.
*H02G 7/05* (2006.01)

(52) U.S. Cl.
CPC .................................. *H02G 7/053* (2013.01)

(58) Field of Classification Search
CPC ............ H02G 7/053; H02G 7/00; H02G 7/02; H02G 7/04; H02G 7/20; H02G 7/05; H01B 17/00; H01B 17/02; H01B 17/14; H01B 17/145; H01B 17/16; H01B 17/26
USPC ............ 174/40 CC, 650, 137 R, 148, 152 R, 174/138 R, 40 R, 168, 169; 248/74.1, 248/7.2, 68.1, 49
See application file for complete search history.

(56) References Cited

U.S. PATENT DOCUMENTS

| | | | | |
|---|---|---|---|---|
| 3,737,560 A * | 6/1973 | Takatori | ................. | H01B 17/16 248/278.1 |
| 4,579,306 A * | 4/1986 | Kellett | ................. | F16L 3/1075 248/74.1 |
| 5,064,971 A * | 11/1991 | Bogdanow | ............. | H01B 17/16 174/186 |
| 5,623,125 A * | 4/1997 | Pioch | ...................... | H01F 27/04 174/152 R |
| 5,837,943 A * | 11/1998 | Kellett | ................. | H01B 17/16 24/135 R |
| 7,432,449 B2 * | 10/2008 | Kim | ........................ | H01B 17/16 174/186 |
| 8,173,904 B1 * | 5/2012 | Parduhn | ................. | H01B 17/06 174/138 R |
| 9,343,204 B2 * | 5/2016 | Clement | ................. | H01B 17/22 |
| 10,184,502 B2 * | 1/2019 | Olszewski | ............. | F16B 2/005 |

* cited by examiner

*Primary Examiner* — Angel R Estrada

(57) ABSTRACT

A clamp-type line post insulator is disclosed. The clamp-type line insulator is provided with a thread clamping device, and comprises: a body, a cable clamp, an insulation unit and an adjustable fixing unit. In the present invention, the body comprises: a receiving recess, a fixing base and a cable groove. Moreover, a pivoting end of the cable clamp pivotally connected to a pivot member that is formed on the fixing base. Particularly, after placing an electrical cable in the cable groove, the cable clamp is rotated by taking the pivot member as an axle center, thereby inserting an engaging end of the cable clamp into the engagement groove to engage with it. By such arrangements, the electrical cable be pressed and fixed in the cable groove by rotating the adjustable fixing unit.

10 Claims, 7 Drawing Sheets

CLAMP-TYPE LINE POST INSULATOR

BACKGROUND OF THE INVENTION

1. Field of the Invention

The present invention relates to the technology field of overhead distribution system, and more particularly to a clamp-type line post insulator for receiving and holding securely electrical conductors.

2. Description of the Prior Art

Insulator is an electrically insulating component arranged between an electrical cable and a telephone pole, and is for use in increasing a distance between the electrical cable and a ground so as to ensure safety security. Moreover, the insulator is also used for supporting and hanging the electrical cable. Therefore, the insulator is required to have sufficient insulation strength and high corrosion resistance.

Materials for making the insulator have known being divided into natural organic, inorganic and combinations. Moreover, according to structure features, the commercial insulators are divided into pin insulator, column type, suspension insulator, porcelain insulator (also called butterfly insulator), rod porcelain insulator, pull porcelain insulator, porcelain crossarm insulator, and discharge clamp porcelain insulator. It is understood that, the insulator is easily to be deposited with a severe contamination of fine particles, moisture, dust, and salt on the outer surface thereof because of being disposed outdoors, and the severe contamination induced leakage currents and flashover failure.

Real experiences have indicated that the flashover failure would damage the surface of the insulator, thereby reducing the insulation strength of the insulator. For above reasons, utility workers are assigned to clean and replace the insulator regularly to ensure that the electrical cable and the insulator function normally. However, conventional insulators are fixed on the crossarm of the telephone pole by tying; wherein depending on the voltage and the type of the insulators, the tie methods include side ties, top ties, spool ties. It is extrapolated that, the utility workers have to manually tie the electrical cable on the insulator and memorize multiple methods and procedures for tying the electrical cable, such that the utility workers spend a lot of time for tying the electrical cable, which will increase the human error rate and maintenance time.

From above descriptions, it is clear that, how to design and provide an insulator which is easy to clean, fix and maintain has now become the most important issue. In view of that, inventors of the present application have made great efforts to make inventive research and eventually provided a clamp-type line post insulator for applying in overhead distribution system.

SUMMARY OF THE INVENTION

The primary objective of the present invention is to provide a clamp-type line post insulator for applying in overhead distribution. The clamp-type line post insulator comprises a body, a cable clamp, an insulation unit and an adjustable fixing unit. According to particular design of the present invention, a pivoting end of the cable clamp is pivotally connected to a pivot member that is formed on the fixing base, and an engaging end of the cable clamp is arranged to correspondingly faced to an engagement groove of the fixing base. Particularly, after horizontally placing an electrical cable in the cable groove, the cable clamp rotates about the pivot member, thereby inserting the engaging end of the cable clamp into the engagement groove to engage with it. By such arrangements, rotating the adjustable fixing unit to move downwardly, such that the electrical cable is pressed and fixed in the cable groove. Moreover, the clamp-type line post insulator comprises a lid and a fixing member, after the pivoting end of the cable clamp pivotally connecting with the pivot member, the lid engages with the pivot member. And one end of the fixing member protrudes out of a hole of the lid and a hole of the pivot member to fix the pivoting end of the cable clamp on the fixing base, so as to improve the structural strength between the cable clamp and the fixing base.

In order to achieve the primary objective of the present invention, the inventor of the present invention provides an embodiment for the clamp-type line post insulator, is for application in an overhead distribution system, and comprise:

a body, being connected to a crossarm pin of the overhead distribution system, and comprises:
a fixing base, being formed on a top side of the body, and comprising a pivot member and an engagement groove; wherein the pivot member is pivotally connected with a cable clamp; and
a cable groove, being formed on the body, and being correspondingly positioned between the fixing base and the pivot member;
an insulation unit wrapping the body, and
wherein an adjustable fixing unit protrudes out of the cable clamp so as to be disposed in the cable groove by one part thereof;
wherein after an electrical cable is horizontally placed in the cable groove, the cable clamp rotating with a rotation of the pivot member, such that an engaging end of the cable clamp inserts in the engagement groove, thereby fixing the cable in the cable groove by the adjustable fixing unit.

In the aforesaid embodiment of the clamp-type line post insulator, the adjustable fixing unit comprises:

a bolt, being screwed in a perforation of the cable clamp;
a grip portion, being connected to one end of the bolt, and comprising a through hole; and
a pressing member, being connected to the other end of the bolt, and being located below the cable clamp;
wherein by rotating the grip portion, the bolt rotating and moving downwardly, such that the electrical cable in the cable groove is pressed and fixed by the pressing member.

In the aforesaid embodiment of the clamp-type line post insulator, wherein the insulation unit comprises a plurality of disc-shaped insulators that are located below the fixing base, and the plurality of disc-shaped insulators are partially disposed in a plurality of ring grooves of the body, respectively.

BRIEF DESCRIPTION OF THE DRAWINGS

The invention as well as a preferred mode of use and advantages thereof will be best understood by referring to the following detailed description of an illustrative embodiment in conjunction with the accompanying drawings, wherein.

DETAILED DESCRIPTION OF THE PREFERRED EMBODIMENTS

To more clearly describe a clamp-type line post insulator for applying in an overhead distribution system disclosed by the present invention, embodiments of the present invention will be described in detail with reference to the attached drawings hereinafter.

Figure 1:
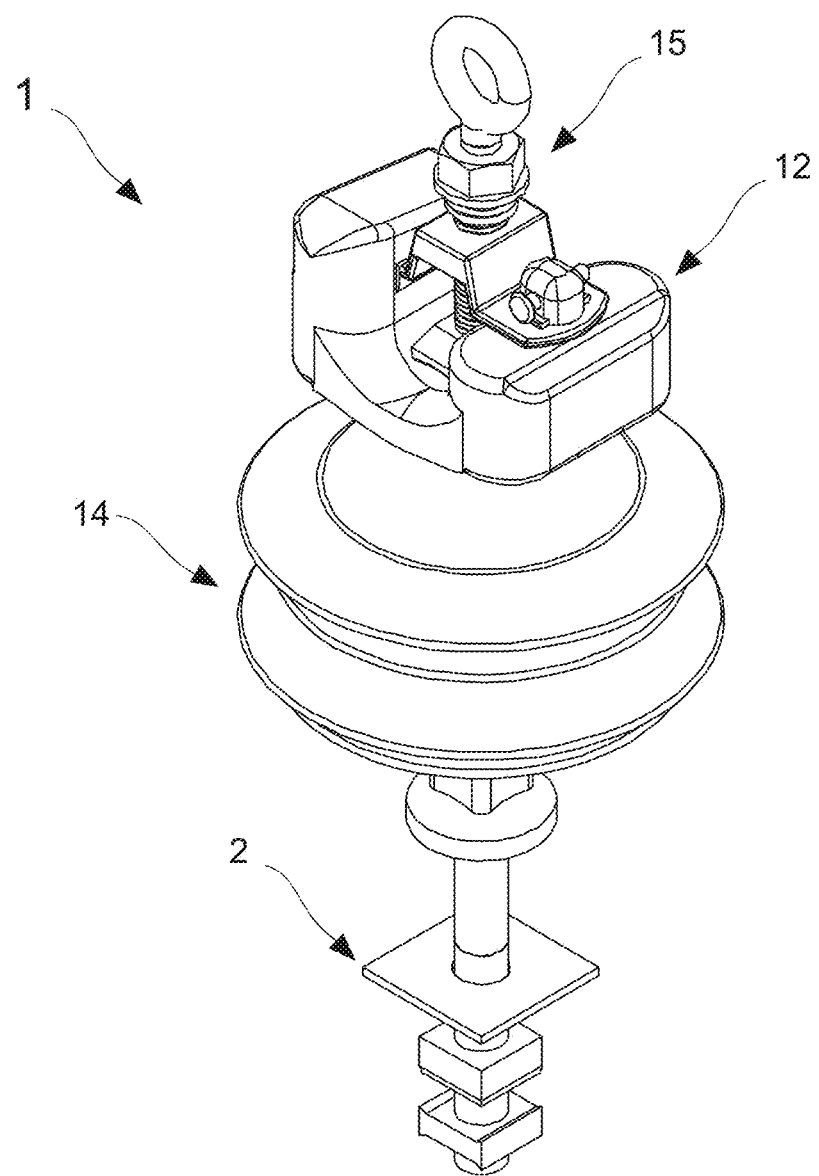
FIG. 1 shows a stereo view of a clamp-type line post insulator.
Figure 2:
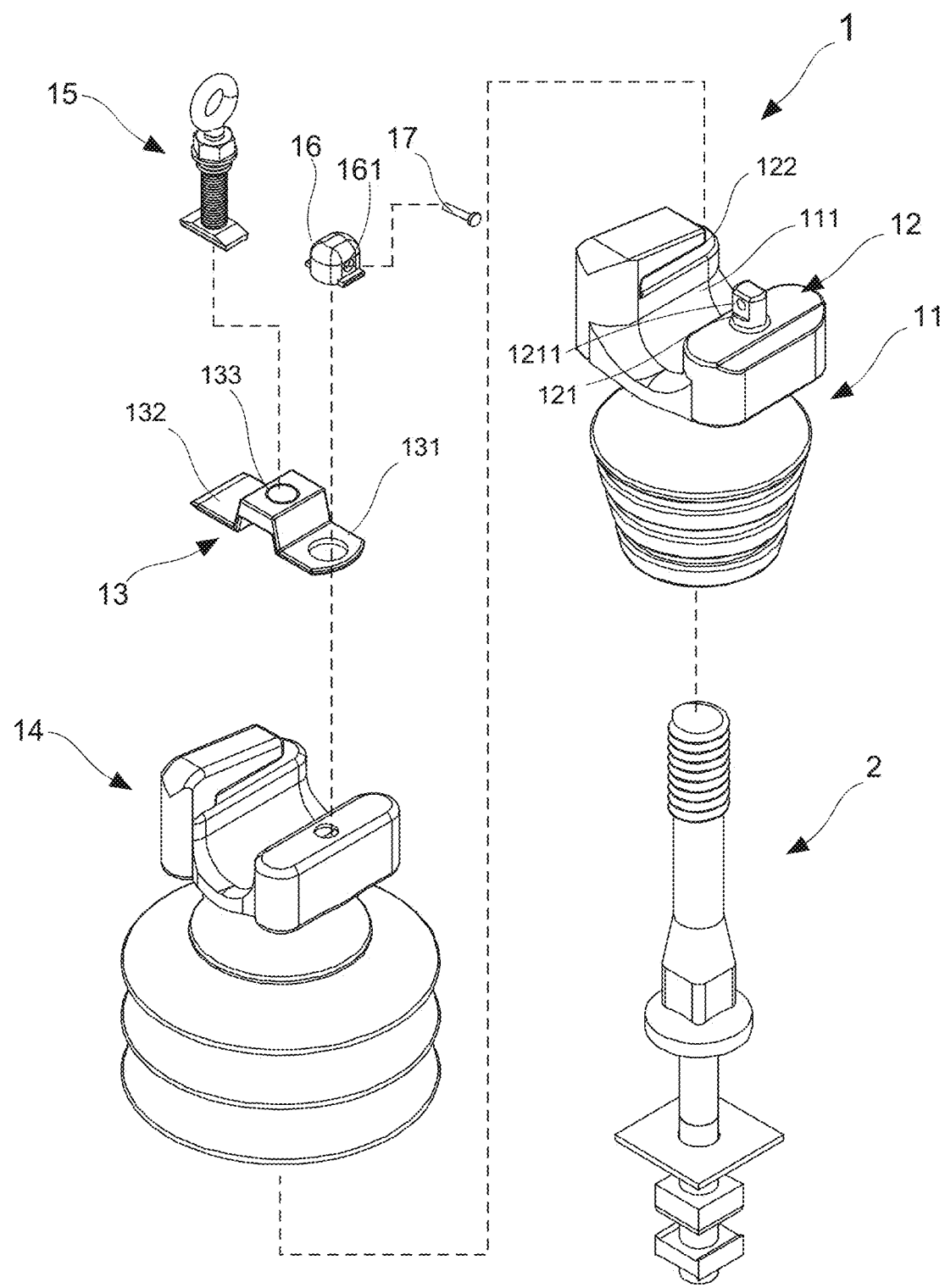
FIG. 2 shows an assembly framework view of the clamp-type line post insulator.
Figure 3:
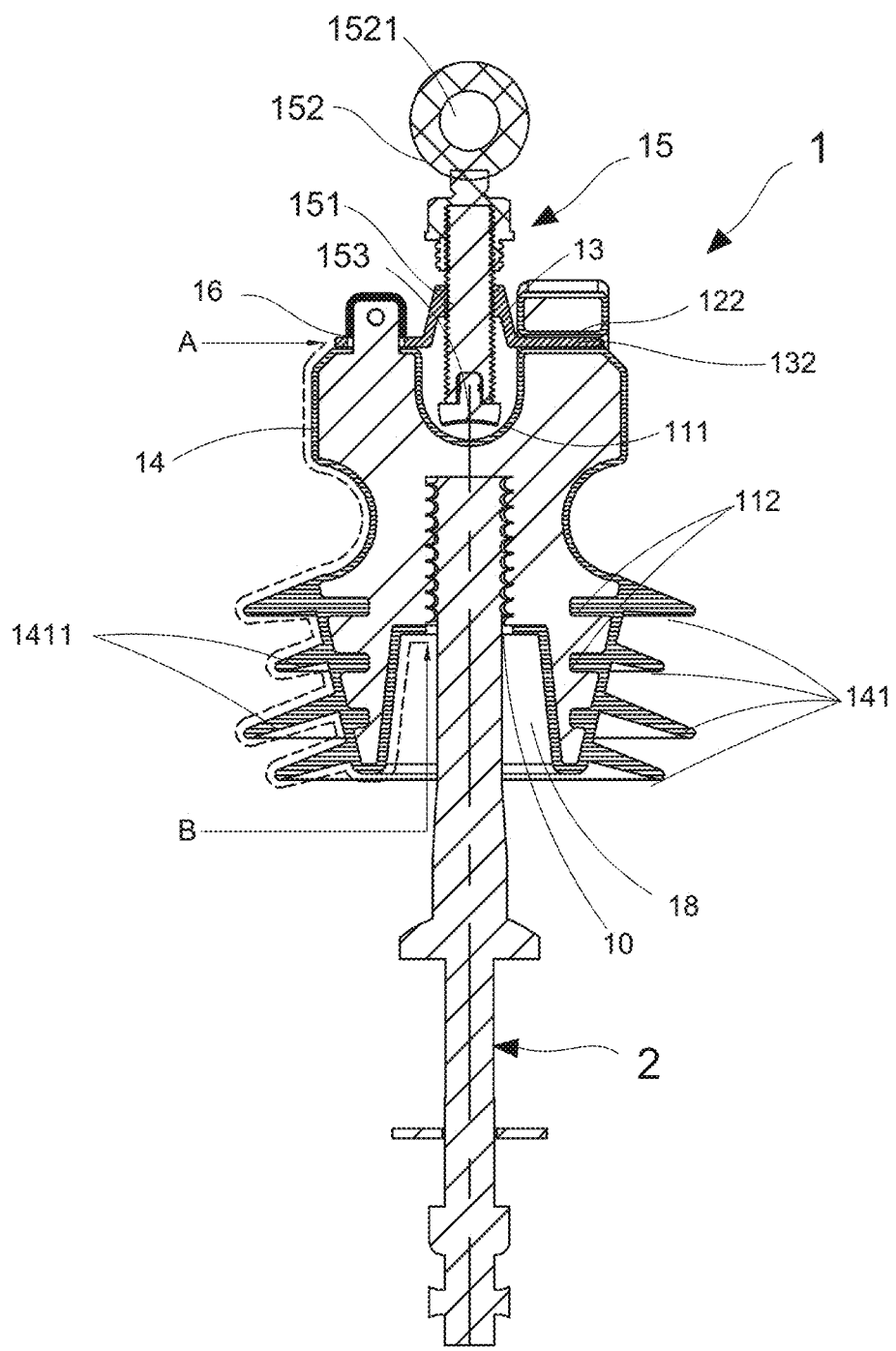
FIG. 3 shows a section view of the clamp-type line post insulator.

FIG. 1 show a stereo view of a clamp-type line post insulator. FIG. 2 shows an assembly framework view of the clamp-type line post insulator, and FIG. 3 shows a section view of the clamp-type line post insulator. From FIG. 2 and FIG. 3, it can find that the clamp-type line post insulator 1 comprises: a body 11, a cable clamp 13, an insulation unit 14 and an adjustable fixing unit 15. Particularly, the body 1 comprises: a receiving recess 10, a cable groove 111 and a fixing base 12. Particularly, the receiving recess 10 is formed on a bottom of the body 11, and is connected with a crossarm pin 2 of the overhead distribution system. Moreover, the fixing base 12 is formed on a top side of the body 11, and comprises a pivot member 121 and an engagement groove 122. The cable groove 111 is formed on the body 11, and is correspondingly positioned between the pivot member 121 and the engagement groove 122. According to FIG. 2 and FIG. 3, it is known that the insulation unit 14 wraps the body 11, the pivot member 121 and the receiving recess 10 are not covered by the insulation unit 14.

Figure 4:
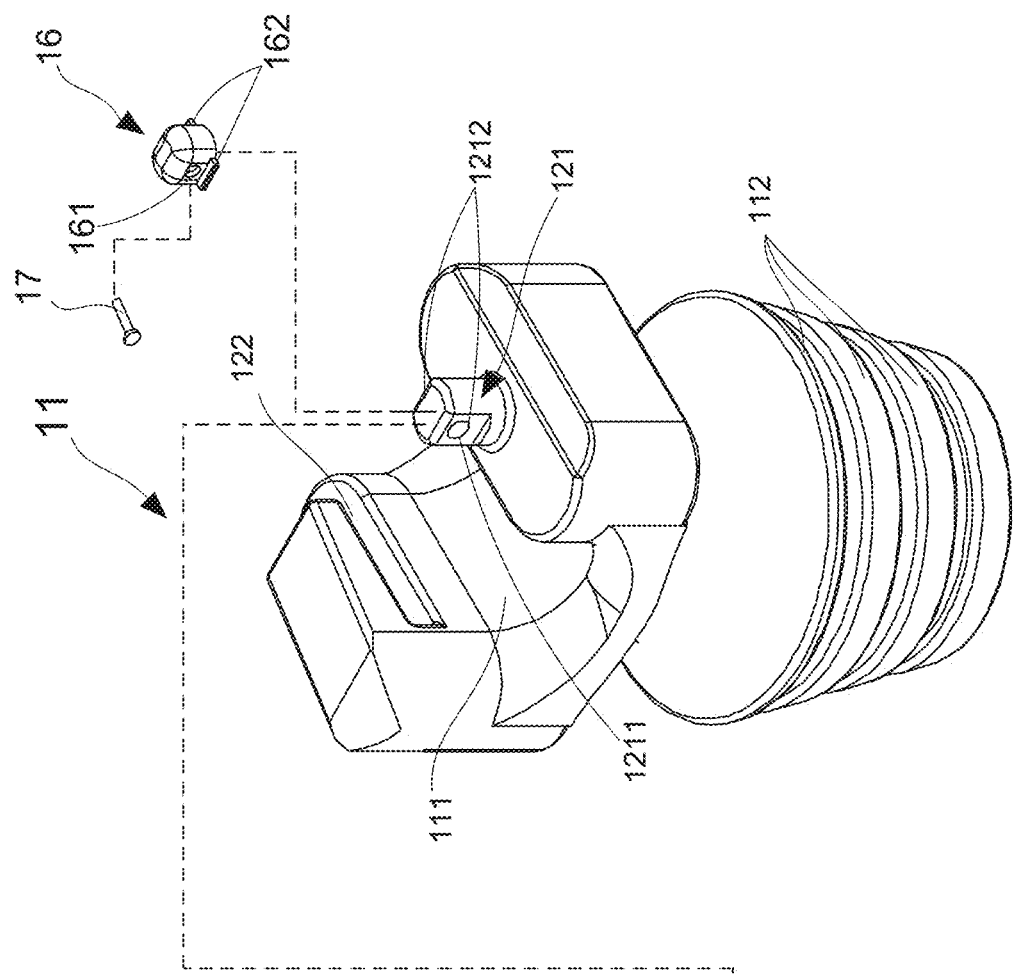
FIG. 4 shows an assembly framework view of a body, an adjustable fixing unit, a lid and a fixing member.
Figure 4:
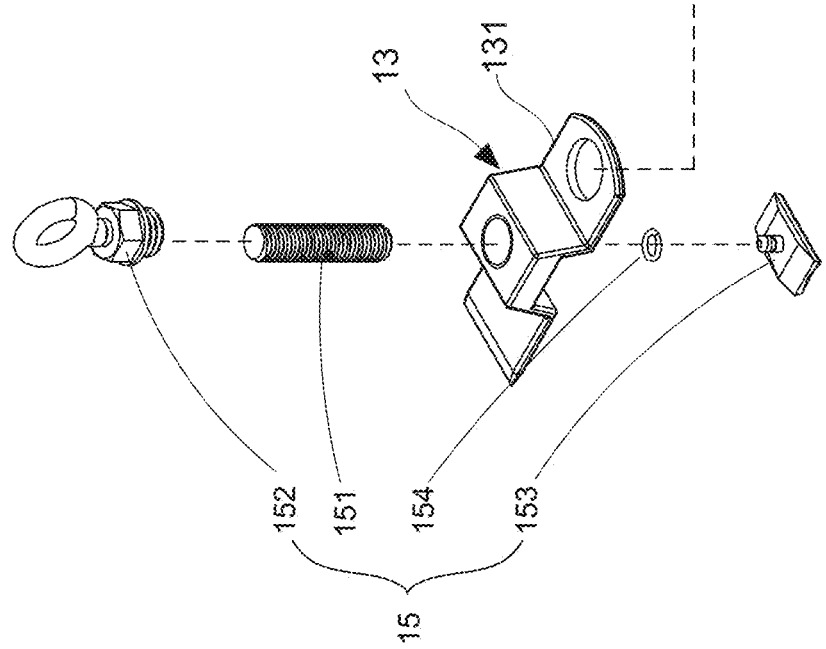

FIG. 4 shows an assembly framework view of a body, an adjustable fixing unit, a lid and a fixing member. According to FIG. 2, FIG. 3 and FIG. 4, it is known that a pivoting end 131 of the cable clamp 13 pivotally connects with the pivot member 121 of the fixing base 12. One part of the adjustable fixing unit 15 protrudes out of the cable clamp 13, so as to be disposed in the cable groove 111. By such arrangements, after an electrical cable is horizontally placed in the cable groove 111, the cable clamp is rotates around the pivot member 121 by a first external force, such that an engaging end 132 of the cable clamp 13 inserts in the engagement groove 122, thereby fixing the electrical cable in the cable groove 111 by the adjustable fixing unit 15. Particularly, the adjustable fixing unit 15 comprises: a bolt 151, a grip portion 152 and a pressing member 153. The bolt 151 is screwed in a perforation 133 of the cable clamp 13, and the grip portion 152 is connected to one end of the bolt 151. From FIG. 3, it is understood that the pressing member 153 is connected to the other end of the bolt 151, and is located below the cable clamp 13. In the present invention, by rotating the grip portion 152, the bolt 151 rotates and moves downwardly, such that the electrical cable in the cable groove 111 is pressed and fixed by the pressing member 153.

The clamp-type line post insulator 1 comprises a lid 16 and a fixing member 17. Wherein after the pivoting end 131 is pivotally connected to the pivot member 121, the lid 16 wraps and engages with the pivot member 121, and the lid 16 is located above the pivoting end 131 of the cable clamp 13. Moreover, the fixing member 17 passes through the lid 16. One end of the fixing member 17 protrudes out of a hole 161 of the lid 16 and a hole 1211 of the pivot member 121 to fix the pivoting end 131 of the cable clamp 13 on the fixing base 12. On the other hand, the clamp-type line post insulator 1 comprises a connection rope that is connected between the body 11, the lid 16 and/or the fixing member 17, so as to prevent the lid 16 and the fixing member 17 from falling and losing. From FIG. 3, it is found that the insulation unit 14 comprises a plurality of disc-shaped insulators 141 that are located below the fixing base 12. Moreover, the plurality of disc-shaped insulators 141 are partially disposed in a plurality of ring grooves 121 of the body 11, respectively. Therefore, according to particular design of the plurality of disc-shaped insulators, it improves a structural strength between the insulation unit 14 and the body 11, and also improves a durability of the insulation unit 14. A lower surface of the pressing member 153 is a curved surface to increase a contact area between the pressing member 153 and the electrical cable, thereby increasing a friction between the pressing member 153 and the electrical cable as well.

Figure 5:
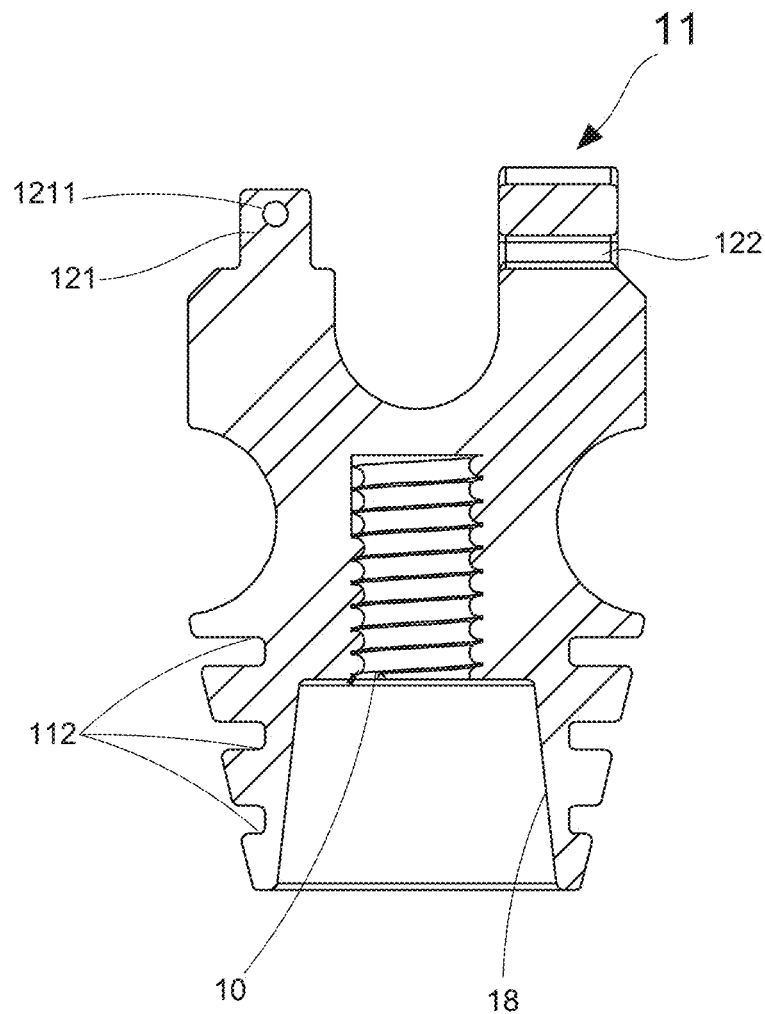
FIG. 5 shows a section view of the body.
Figure 6:
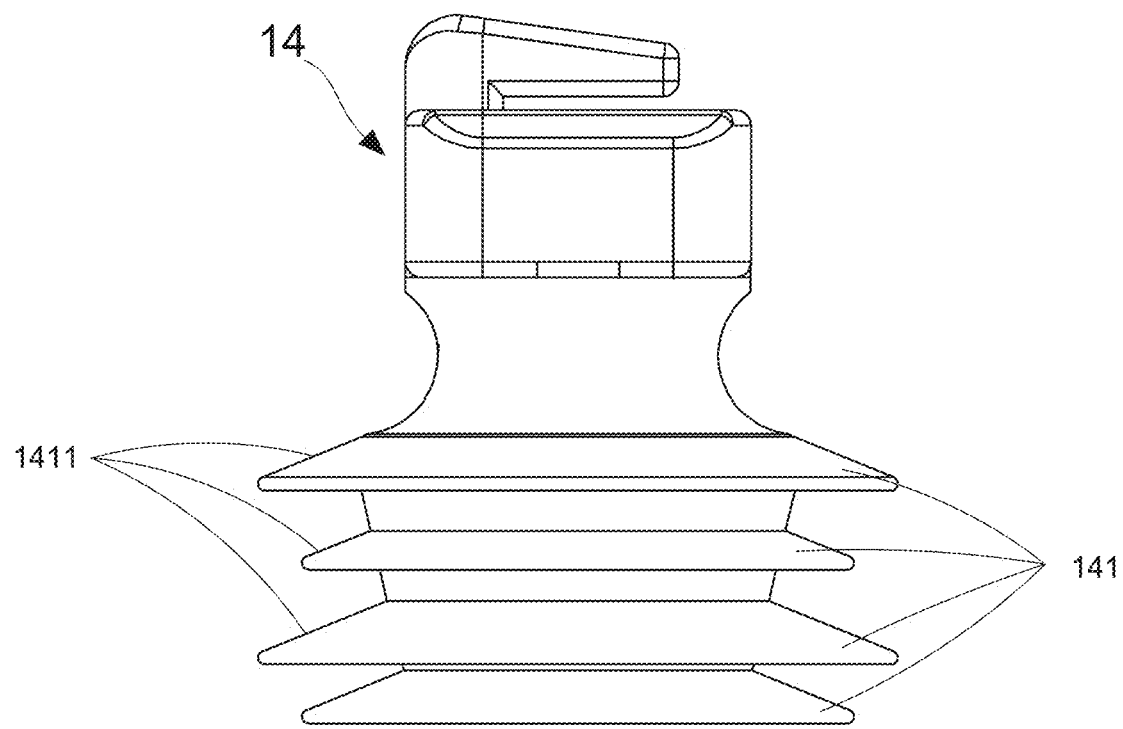
FIG. 6 shows a stereo view of an insulation unit.
Figure 7:
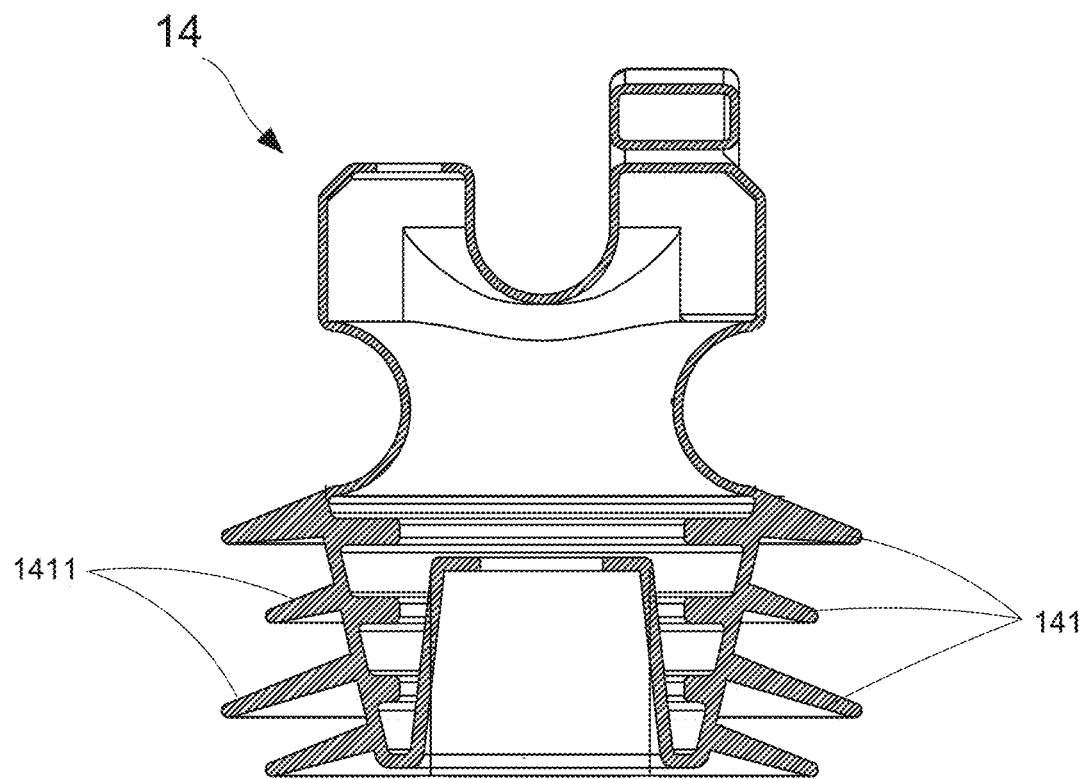
FIG. 7 shows a section view of the insulation unit.

FIG. 5 shows a section view of the body. As shown in FIG. 3, FIG. 4 and FIG. 5, the body 11 comprises a recessed portion 18 that is formed on the bottom of the body 11, and is positioned around the receiving recess 10 to increase a creepage distance of the clamp-type line post insulator 1. For instance, in this embodiment, the creepage distance of the clamp-type line post insulator 1 is a distance between a first point A and a second point B in FIG. 3. As shown in FIG. 3, in this embodiment, the height of the body 11 is 162 millimeters, and the creepage distance of the clamp-type line post insulator 1 is 396 millimeters. On the other hand, the adjustable fixing unit 15 comprises an O-ring 154 that is located between the bolt 151 and the pressing member 153, so as to decrease a gap between the bolt 151 and the pressing member 153. FIG. 6 shows a stereo view of the insulation unit, and FIG. 7 shows a section view of the insulation unit. As shown in FIG. 6, each of the plurality of disc-shaped insulators 141 has a slant outer surface 1411. Real experiences have indicated that the plurality of disc-shaped insulators 141 have different lengths, such that the clamp-type line post insulator 1 would not easily to be deposited with a contamination of water and dust. Moreover, the pivot member 122 has two flat surfaces 1212 for engaging with two bars 162 of the lid 16. In other words, the lid 16 and the pivot member 122 are engaged with each other to increase a structural strength between the lid 16 and the pivot member 122.

In this embodiment, the receiving recess 10 is a female thread, and is connected to a stud of the crossarm pin 2. However, the receiving recess 10 and the crossarm pin 2 should not be limited by the above example, and are selected from any part of the group consisting of: crew holes, rivet hole, magnet screw. On the other hand, the grip portion 152 has a through hole 1521 that is used to tie a fixing rope, in order to prevent the clamp-type line post insulator 1 from falling during the using of the clamp-type line post insulator 1.

Therefore, through above descriptions, the clamp-type line post insulator proposed by the present invention have been introduced completely and clearly; in summary, the present invention includes the advantages of:

(1) The clamp-type line post insulator 1 comprises a body 11, a cable clamp 13, an insulation unit 14 and an adjustable fixing unit 15. A pivoting end 131 of the cable clamp 13 is pivotally connected to a pivot member 121 that is formed on the fixing base 12, and an engaging end 132 of the cable clamp 13 is arranged to correspondingly faced to an engagement groove 122 of the fixing base 12. By such arrangements, rotating the adjustable fixing unit 15 to move downwardly, such that the electrical cable is pressed and fixed in the cable groove 111.

(2) On the other hand, the clamp-type line post insulator 1 comprises a lid 16 and a fixing member 17, after the pivoting end 131 of the cable clamp 13 pivotally connecting with the pivot member 121, the lid 16 engages with the pivot member 121. And one end of the fixing member 17 protrudes out of a hole 161 of the lid 16 and a hole 1211 of the pivot member 121 to fix the pivoting end 131 of the cable clamp 13 on the fixing base 12, so as to improve the structural strength between the cable clamp 13 and the fixing base 12. Moreover, the insulation unit 14 comprises a plurality of disc-shaped insulators 141. The plurality of disc-shaped insulators 141 are partially and respectively placed in a plurality of ring grooves 121 of the body 11, thereby increasing a durability of the insulation unit 14.

The above description is made on embodiments of the present invention. However, the embodiments are not intended to limit scope of the present invention, and all equivalent implementations or alterations within the spirit of the present invention still fall within the scope of the present invention.

What is claimed is:

1. A clamp-type line post insulator for applying in an overhead distribution system, comprising
    a body, being connected to a crossarm pin of the overhead distribution system, and comprises:
        a fixing base, being formed on a top side of the body, and comprising a pivot member and an engagement groove; wherein the pivot member is pivotally connected with a cable clamp; and
        a cable groove, being formed on the body, and being correspondingly positioned between the engagement groove and the pivot member;
    an insulation unit wrapping the body, and
    wherein an adjustable fixing unit protrudes out of the cable clamp so as to be disposed in the cable groove by one part thereof;
    wherein after an electrical cable is horizontally placed in the cable groove, the cable clamp rotating with a rotation of the pivot member, such that an engaging end of the cable clamp inserts in the engagement groove, thereby fixing the electrical cable in the cable groove by the adjustable fixing unit.

2. The clamp-type line post insulator of claim 1, wherein the insulation unit comprises a plurality of disc-shaped insulators that are located below the fixing base, and the plurality of disc-shaped insulators are partially disposed in a plurality of ring grooves of the body, respectively.

3. The clamp-type line post insulator of claim 1, wherein the adjustable fixing unit comprises:
    a bolt, being screwed in a perforation of the cable clamp;
    a grip portion, being connected to one end of the bolt, and comprising a through hole; and
    a pressing member, being connected to the other end of the bolt, and being located below the cable clamp;
    wherein by rotating the grip portion, the bolt rotating and moving downwardly, such that the electrical cable in the cable groove is pressed and fixed by the pressing member.

4. The clamp-type line post insulator of claim 1, comprising:
    a lid, being engaged with the pivot member, and having two bars;
    a fixing member, passing through the lid; wherein one end of the fixing member protrudes out of a hole of the lid and a hole of the pivot member to fix a pivoting end of the cable clamp on the fixing base.

5. The clamp-type line post insulator of claim 3, wherein a lower surface of the pressing member is a curved surface.

6. The clamp-type line post insulator of claim 1, wherein the body comprises a receiving recess that is formed on a bottom of the body, and the receiving recess is connected with the crossarm pin.

7. The clamp-type line post insulator of claim 6, wherein the body comprises a recessed portion that is formed on the bottom of the body, and being positioned around the receiving recess to increase a creepage distance of the clamp-type line post insulator.

8. The clamp-type line post insulator of claim 3, wherein the adjustable fixing member comprises an O-ring that is located between the bolt and the pressing member.

9. The clamp-type line post insulator of claim 2, wherein each of the plurality of disc-shaped insulators has a slant outer surface.

10. The clamp-type line post insulator of claim 4, wherein the pivot member has two flat surfaces for engaging with the two bars of the lid.

* * * * *